(12) United States Patent
Lin

(10) Patent No.: US 7,010,865 B2
(45) Date of Patent: Mar. 14, 2006

(54) BRAKING STRUCTURE OF MEASURING TAPE

(75) Inventor: Henry Lin, Taipei (TW)

(73) Assignee: Index Measuring Tape Co., Ltd., Taipei (TW)

( * ) Notice: Subject to any disclaimer, the term of this patent is extended or adjusted under 35 U.S.C. 154(b) by 0 days.

(21) Appl. No.: 11/000,887

(22) Filed: Dec. 2, 2004

(65) Prior Publication Data

US 2006/0000106 A1   Jan. 5, 2006

Related U.S. Application Data

(63) Continuation-in-part of application No. 10/352,962, filed on Jan. 29, 2003, now Pat. No. 6,836,975.

(51) Int. Cl.
*G01B 3/10* (2006.01)

(52) U.S. Cl. .................................. 33/767; 242/381.3
(58) Field of Classification Search ................ 33/767, 33/755, 769, 761; 242/381.5, 381.3, 381.6, 242/396.5, 396.6, 380, 381, 422.5, 422.4
See application file for complete search history.

(56) References Cited

U.S. PATENT DOCUMENTS

| 4,449,302 | A | * | 5/1984 | Drechsler et al. ............. 33/767 |
| 4,938,430 | A | * | 7/1990 | Chapin ..................... 242/381.3 |
| 5,395,069 | A | * | 3/1995 | Chen ....................... 242/381.3 |
| 5,400,521 | A | * | 3/1995 | Waldherr ...................... 33/767 |
| 6,026,585 | A | * | 2/2000 | Li ............................... 33/767 |
| 6,308,432 | B1 | * | 10/2001 | Gilliam et al. ................ 33/767 |
| 6,431,486 | B1 | * | 8/2002 | Lee ......................... 242/381.3 |
| 6,491,248 | B1 | * | 12/2002 | Liu ......................... 242/381.3 |
| 6,836,975 | B1 | * | 1/2005 | Lin ............................. 33/767 |

* cited by examiner

*Primary Examiner*—Diego Gutierrez
*Assistant Examiner*—Amy R. Cohen
(74) *Attorney, Agent, or Firm*—Troxell Law Office PLLC

(57) ABSTRACT

A braking structure of measuring tape, including a housing, a tape rule contained in the housing and a braking mechanism, characterized in that: a push button is formed onto the housing, by pushing the push button into the housing to keep it at a lower position; a braking plate of the braking mechanism would effectively suspend the movement of the tape rule, and after that, if the push button is pushed downward again, the braking mechanism would push the push button upward and return to its higher position, and the braking plate of the braking mechanism would separate the tape rule and the movement of the tape rule would not be suspended.

8 Claims, 9 Drawing Sheets

BRAKING STRUCTURE OF MEASURING TAPE

RELATED APPLICATIONS

This application is a continuation-in-part (CIP) of U.S. application Ser. No. 10/352,962 filed Jan. 29, 2003, entitled "Braking Structure of Measuring Tape", now U.S. Pat. No. 6,836,975.

BACKGROUND OF THE INVENTION

1. Field of the Invention

The present invention relates to a braking structure of measuring tape, especially to a braking mechanism by which the movement of the rule would be effectively suspended, and the braking function of measuring tape is easily to be withdrawn by simply pushing a control button.

2. Description of the Prior Art

As shown in FIG. 1A, the conventional measuring tape rule has a pushing key 101 above the housing 100, the pushing key 101 is connected with a pressing leg 102 which is put inside the housing 100. When the pushing key 101 is pushed downward by the user, the pressing 102 would slide downward and its lower end would press the upper surface of tape rule 103; then the movement of tape rule 103 is suspended (as shown in FIG. 1B.)

In using the above shown structure, since the movement of tape rule 103 is suspended when the pushing key 101 is pushed downward and the lower end of said pressing leg is pressed against the upper surface of the tape rule 103, when the pushing force is withdrawn, the tape rule would be rewound back into the housing immediately. It is then inconvenient for people to use.

FIG. 1C shows another prior art of measuring tape invented by the inventor. It is characterized in that, a pushing key 201 can be installed onto an upper corner of the housing, said pushing key 201 can be rotated with a shaft 202 through the center of the lower end of said pushing key 201. Such that when one end of pushing key 201 is pushed downward, the pressing element 203 installed beneath the pushing key 201 would be pushed downward to press the tape rule 204, then if different end of the pushing key 201 is pressed, then the pressing force against tape rule is removed.

In using the measuring tape as shown in FIG. 1C, the movement of tape rule can be easily controlled. However, it is still necessary to install a pushing key onto the housing, then the beauty of a whole body and the comfort of holding the measuring tape are greatly reduced.

Furthermore, in order to suspend the movement of the tape rule, a pushing force which would overcome the force to rewind the tape rule should be performed. It is a hard work to people's thumb. Therefore, the conventional measuring tapes are not convenient for people's uses.

In addition, since the pushing key has to have the function of pushing the tape stopping element, the measuring tape together with its tape stopping element then has to occupy a relative volume to endure the stopping force performed onto the pushing key. It is then easy to cause injury to people.

In order to improve the aforementioned defects, the inventor of present invention has made a great effort and has made many novel designs.

SUMMARY OF THE INVENTION

Accordingly, the object of the present invention is to provide a braking structure of a measuring tape which is actuated by a push button set in an opening formed on the housing of the measuring tape and a braking mechanism installed inside the housing. When the push button is pushed to move up and down, the braking mechanism would be moved so as to stop or release the tape rule. Thus, the rule may conveniently and effectively be controlled.

A further object of the present invention is in that the push button can be easily pushed downward by a light force rather than by heavily pushing the conventional pushing key. It is then much easier and convenient to people.

The present invention will be better understood and its numerous objects and advantages will become apparent to those skilled in the art by referencing to the following drawings in which:

DETAILED DESCRIPTION OF THE PREFERRED EMBODIMENT

FIGS. 1A to 1D show the examples of conventional measuring tape; their functions and disadvantages are described as above; it is not repeated herewith.

Figure 1A:
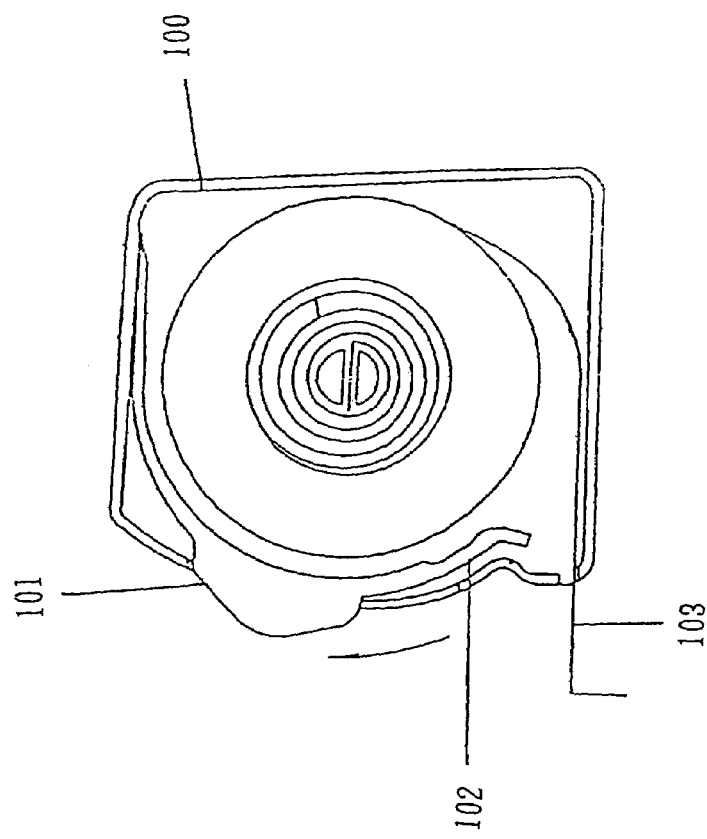
FIG. 1A is a cross-sectional view of a prior measuring tape.
Figure 1B:
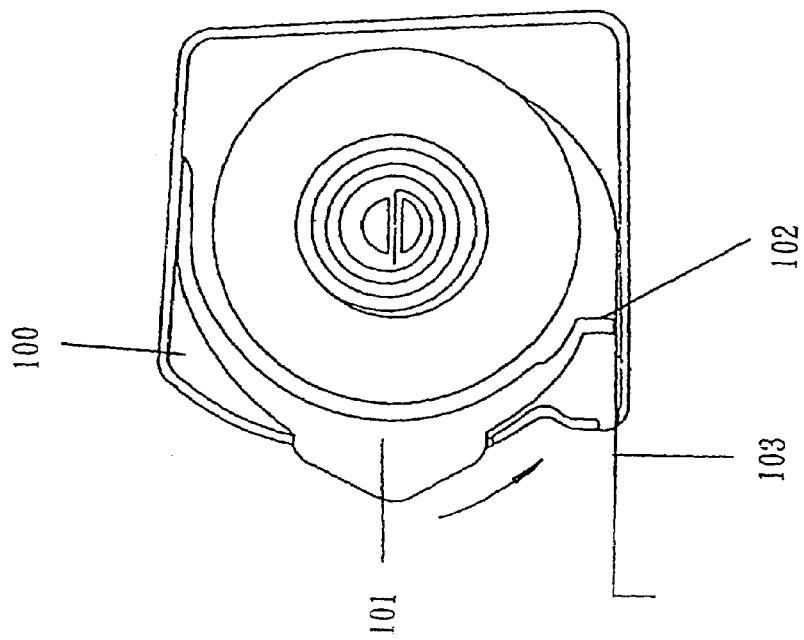
FIG. 1B is a cross-sectional view of a prior measuring tape of FIG. 1A in using.
Figures 1C, 1D:
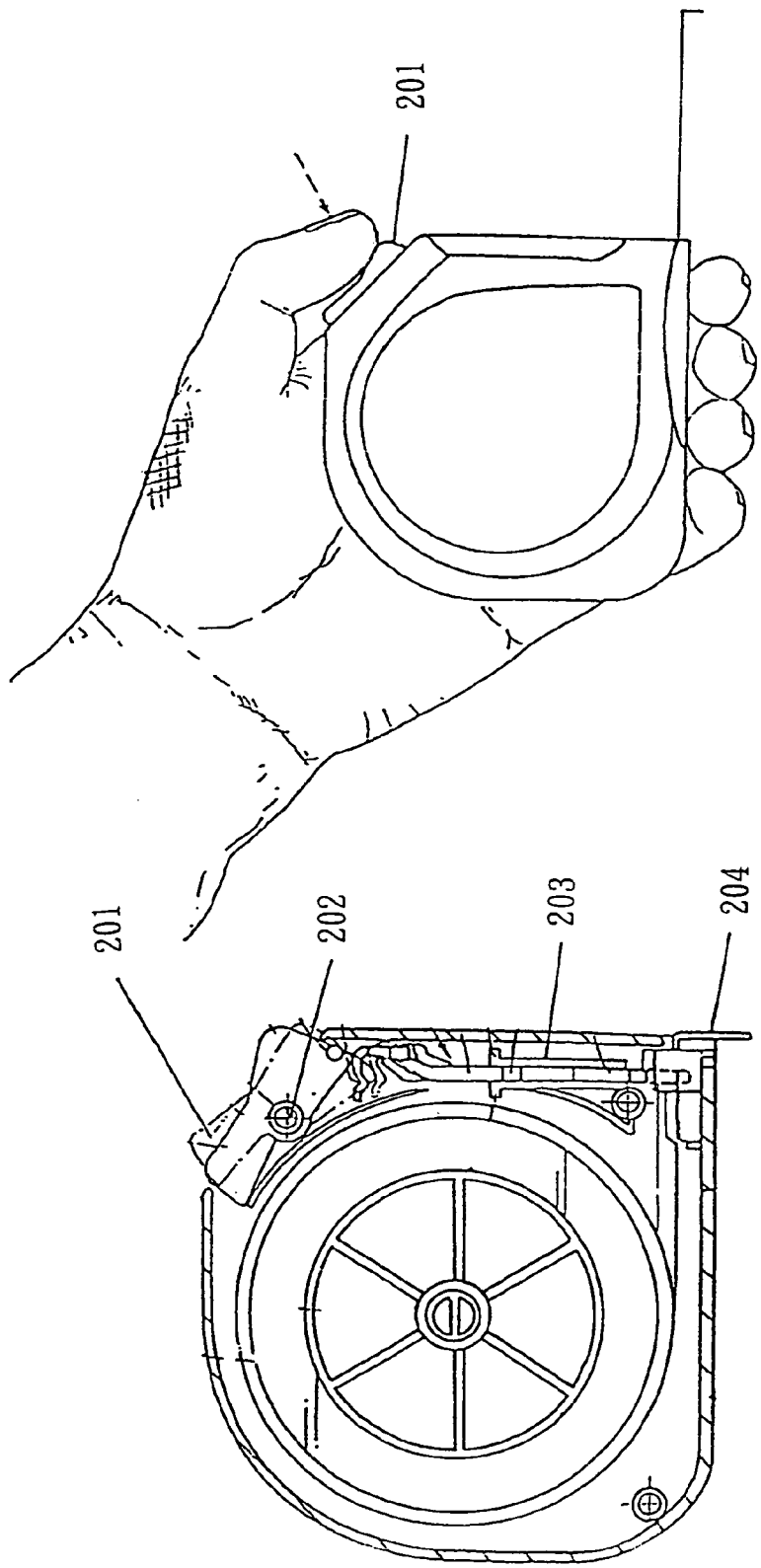
FIG. 1C is a cross-sectional view of another prior measuring tape.
FIG. 1D is a cross-sectional view of another prior measuring tape of FIG. 1C in using.
Figure 2:
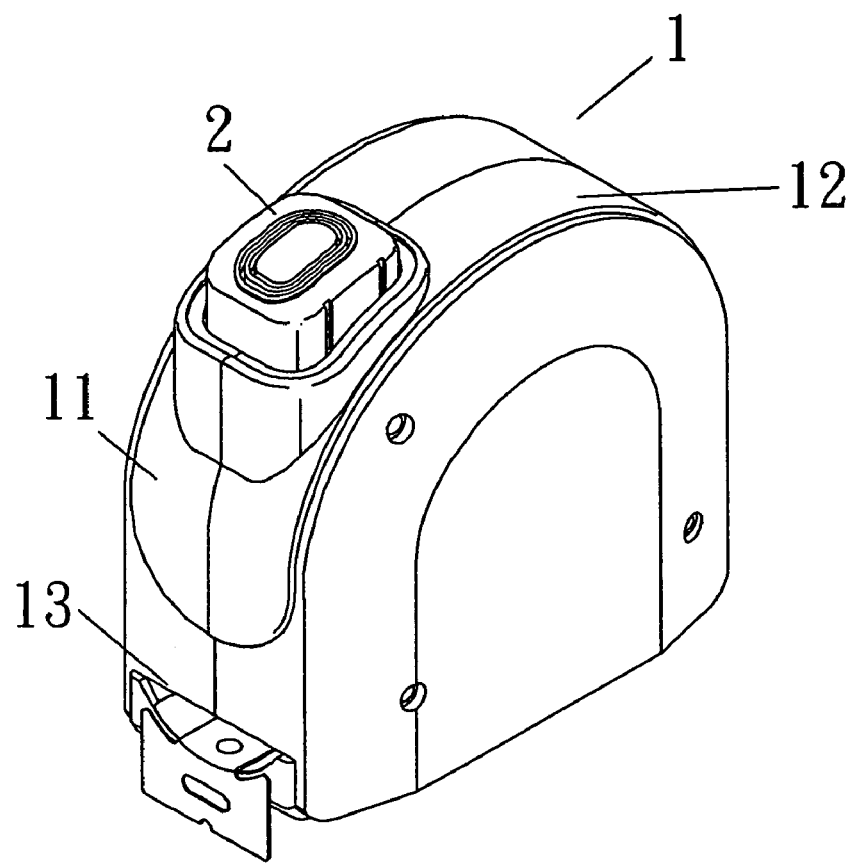
FIG. 2 is a perspective view of the present invention.

As shown in FIG. 2, the outer body of the measuring tape of present invention is composed by a housing 1 and a control button 2 is installed in an opening formed at the front upper portion of the housing 1, the housing 1 is constructed by a left housing 11 and a right housing 12 to screw together, and an opening to be the exit of tape rule is also formed at the lower end of front side of the housing 1.

Figure 3A:
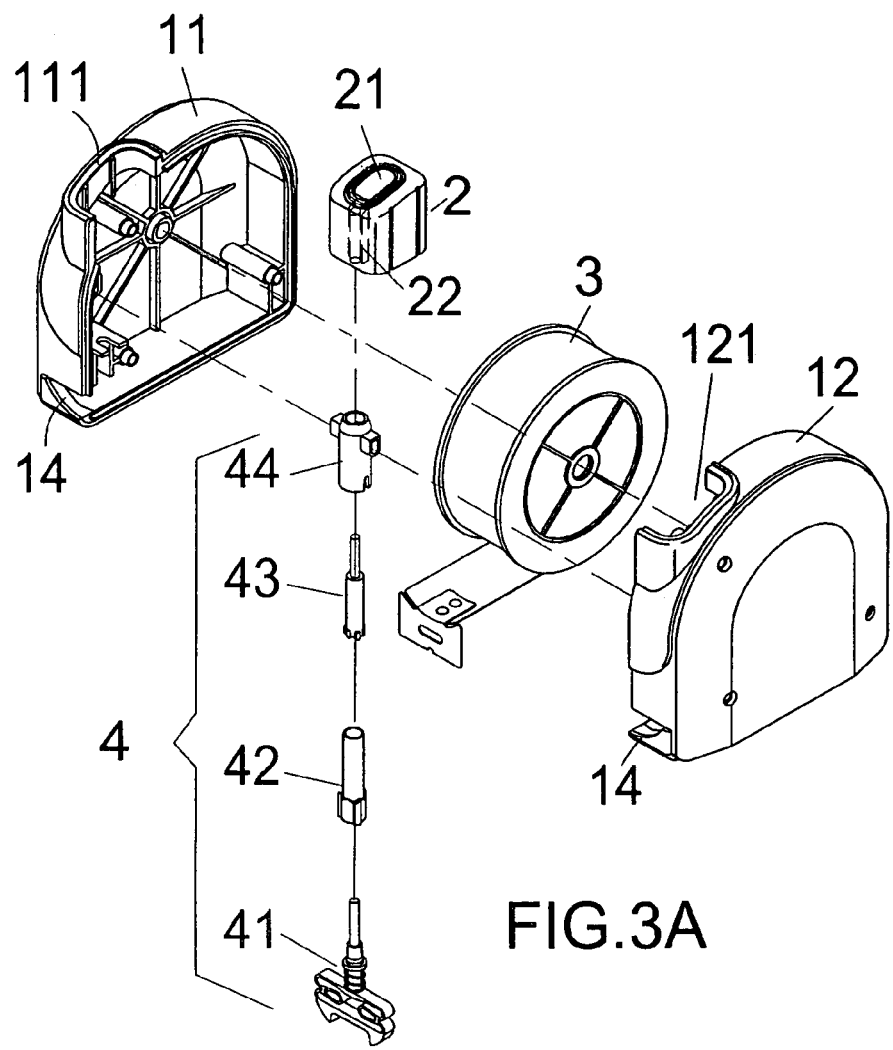
FIG. 3A is an exploded view showing the structure of the measuring tape according to the present invention.
Figure 3B:
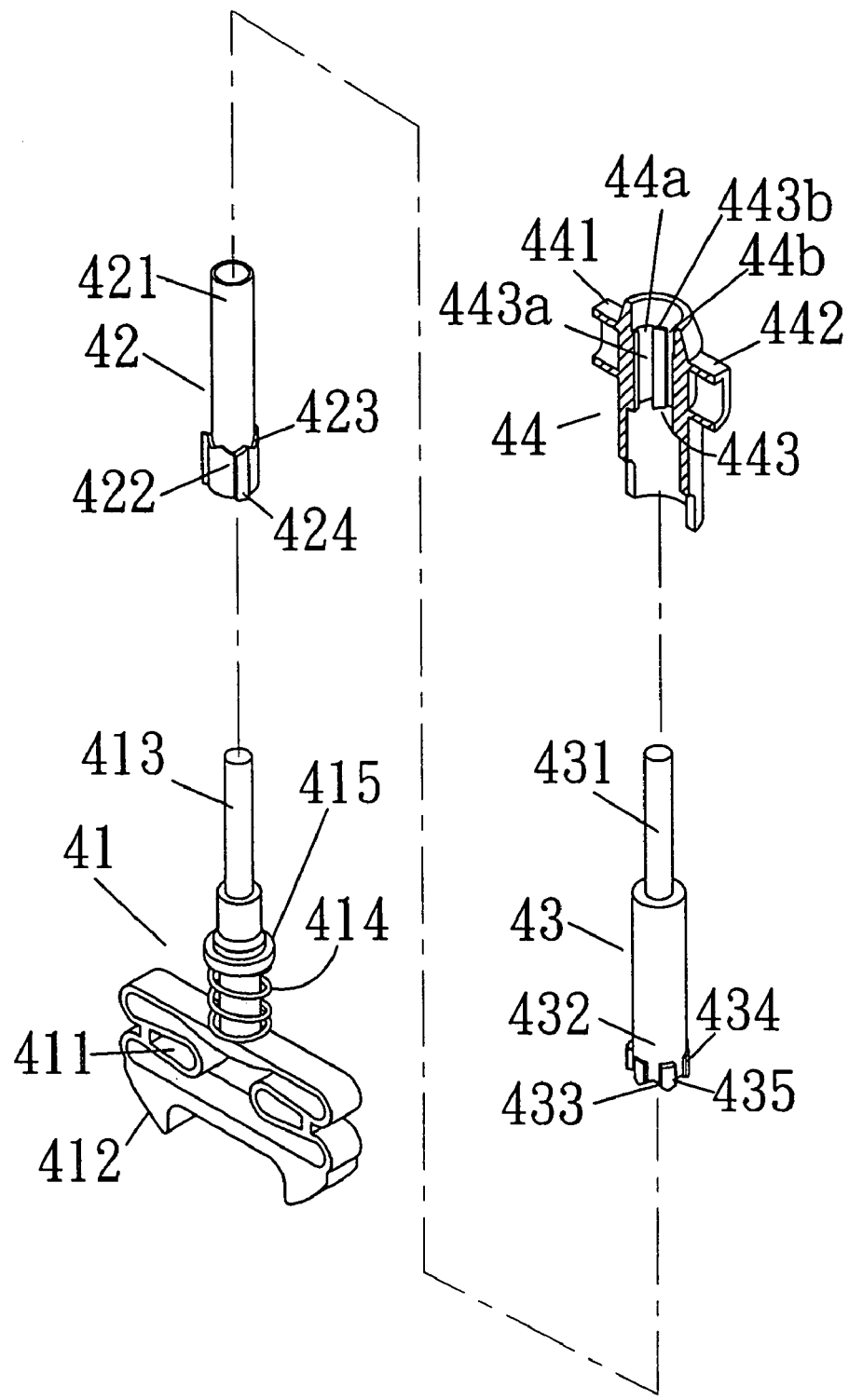
FIG. 3B is an enlarged view showing the braking mechanism of the present invention.

As shown in FIGS. 3A and 3B, inside the housing 1, there is a tape rule 3 and a braking mechanism 4 is installed into a front space inside the housing 1. Said tape rule 3 is clamped by said left housing 11 and right housing 12, and the free end of tape rule 3 can slide through said tape rule exit 13; at the front lower portion on the left housing 11 and the light housing 12 near said tape rule exit 13, a semi-braking furrow 14 is respectively formed. In addition, each of the upper corner of said housings 11 & 12 is formed respectively with a semi-arc opening 111 & 121, such that after said housings 11 & 12 is combined, an opening is formed by the two semi-arc openings 111 & 121 for said control button 2 to pass through. Said control button 2 formed in an irregular shape, its upper-end is a pressing portion 21, and its lower end is communicated to a braking mechanism 4.

Figure 4:
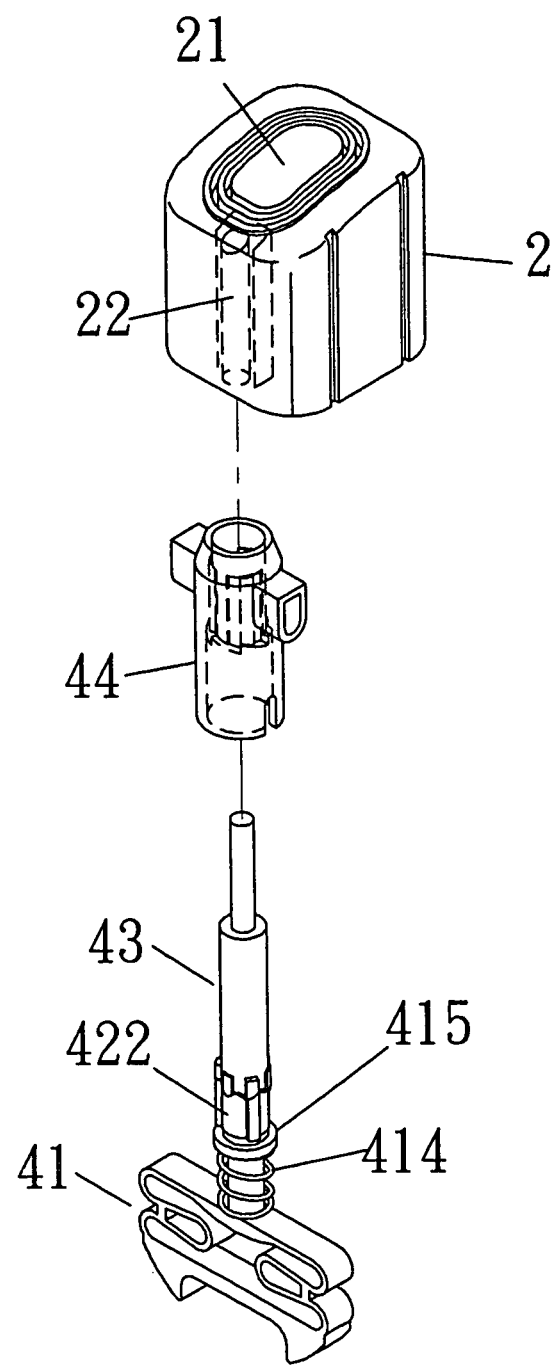
FIG. 4 is an exploded view showing the braking mechanism of present invention in a state of upper position.
Figure 5:
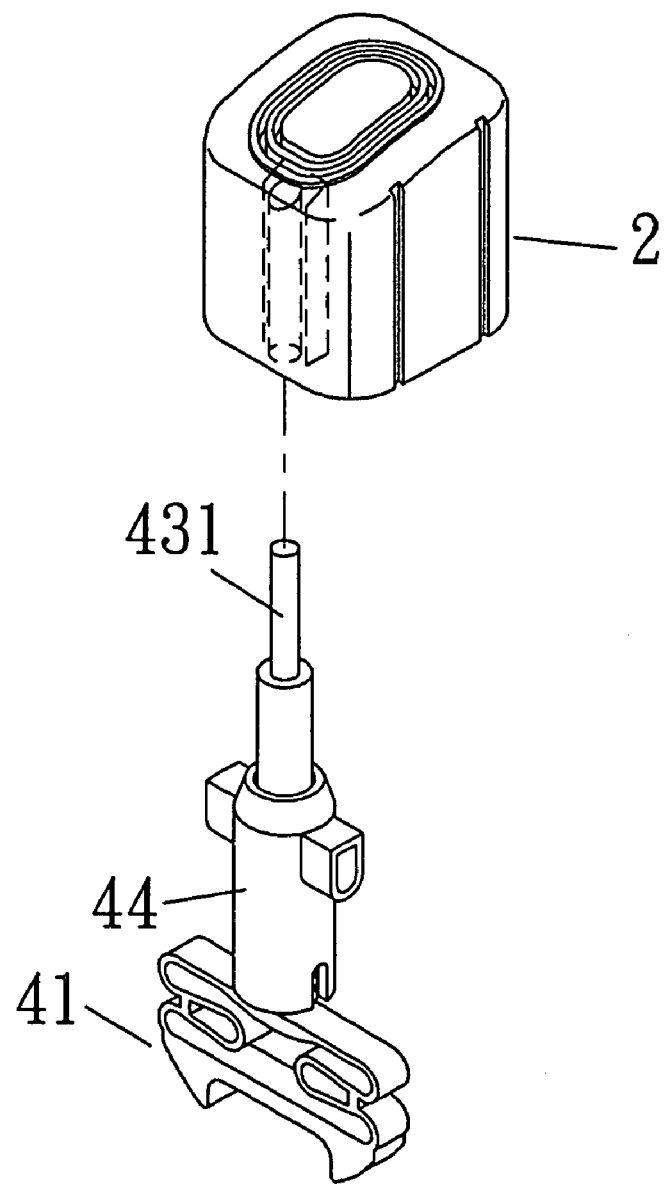
FIG. 5 is a perspective view showing the braking mechanism of present invention.

Please refer to FIGS. 4 and 5, the braking mechanism 4 of the present invention is composed of a pressing base 41, a lower sleeve 42, an upper sleeve 43 and a holding sleeve 44; wherein said pressing base 41 is an irregular body formed by injection, its lower portion contains a plurality of buffering spaces 411, thus it can deposit suitable buffering forces. The lower end of the pressing base 41 forms a tape holding element 412, the upper end of the pressing base 41 forms an extruded pole 413 to be vertically upward extended, there is a spring 414 to be mounted outside onto said extruded pole 413, said spring 414 is then fixed by a ring 415; while the upper portion of said extruded pole 413 contains two sections with different diameters.

Said lower sleeve 42 is a hollow pipe having two sections with two different inner diameters, so as to hold said extruded pole 413. The inner diameter of the upper section 421 of said lower sleeve 42 is smaller than that of the lower section 422. On the outer edge of the upper end of the lower section 422, a plurality of teeth 423 with same spaces between each two of them are formed, and three of the teeth 423 equally separated are formed with blocks 424 having same height.

Said upper sleeve 43 is a hollow sleeve with a plurality of sections of different diameters, its upper section 431 can be inserted into a hollow tube 22 formed inside the control button 2, so as to composite with the control button 2, on the outer edge of the lower edge of its lower section 432 is then formed with teeth 433 which can be bit with said teeth 423; the outer wall of said lower section 432 is formed with two group of blocks 434 and 435, wherein the first group of blocks 434 and the second group of blocks 435 are respectively equally separated, and two groups of blocks 434 and 435 are alternately arranged; the heights of said groups of blocks 434 and 435 are some, and the thickness of said groups of blocks 434 and 435 are different.

Said holding sleeve 44 has a pair of outwardly extruded hooking ears 441, 442 formed on the side walls of the holding sleeve 44, so that the holding ears 441, 442 can be inserted into fixing holds formed inside the housing 11 and 12, and kept it upright inside the housing 1. There are three guiding unit 443 formed on the inner wall near the upper end of said holding sleeve 44, each of the guiding units 443 contains a pair of slope guiding rails 443a, 443b and a guiding groove 44a formed between said guiding rails; there is also a guiding groove 44b formed between each two guiding units 443. The guiding groove 44b formed between each two guiding units has a depth larger than the guiding groove 44a formed between said slope guiding rails 443a, 443b. By this construction, when the first group of blocks 434 and the second group of blocks 435 are in conduct with the guiding units 443. The first group of blocks 434 with higher thickness can be fallen into the guiding groove 44b between two guiding unit 443, while the second group of blocks 435 can only be fallen into the guiding groove 44a between said slope guiding rails 443a, 443b, thus the surface of said slope guiding rails 443a, 443b can be used for driving the upper sleeve 43 to rotate.

Figure 6:
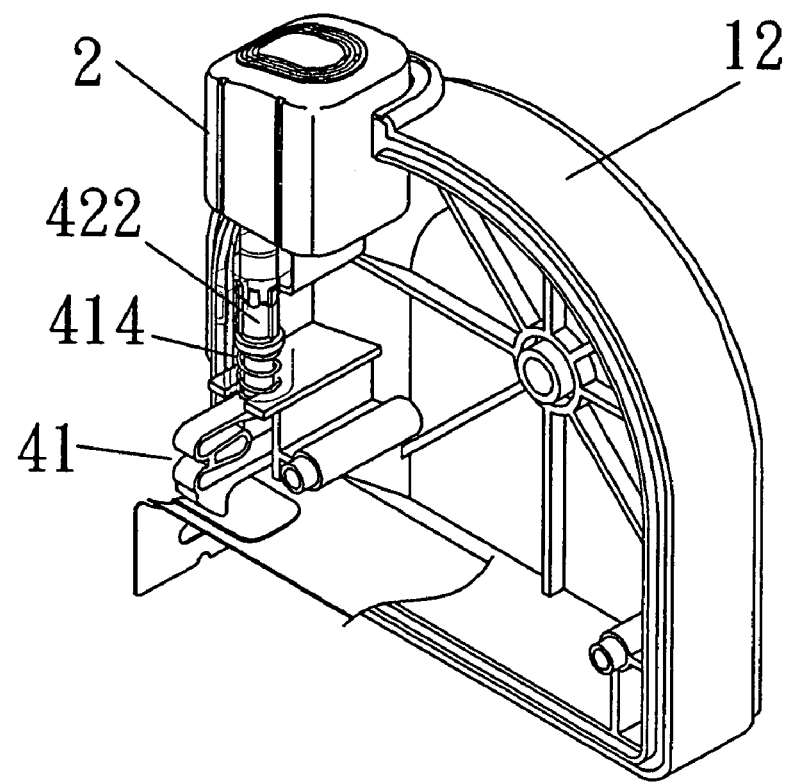
FIG. 6 is a partial perspective view showing the braking mechanism of the present invention in a state of lower position.
Figure 7:
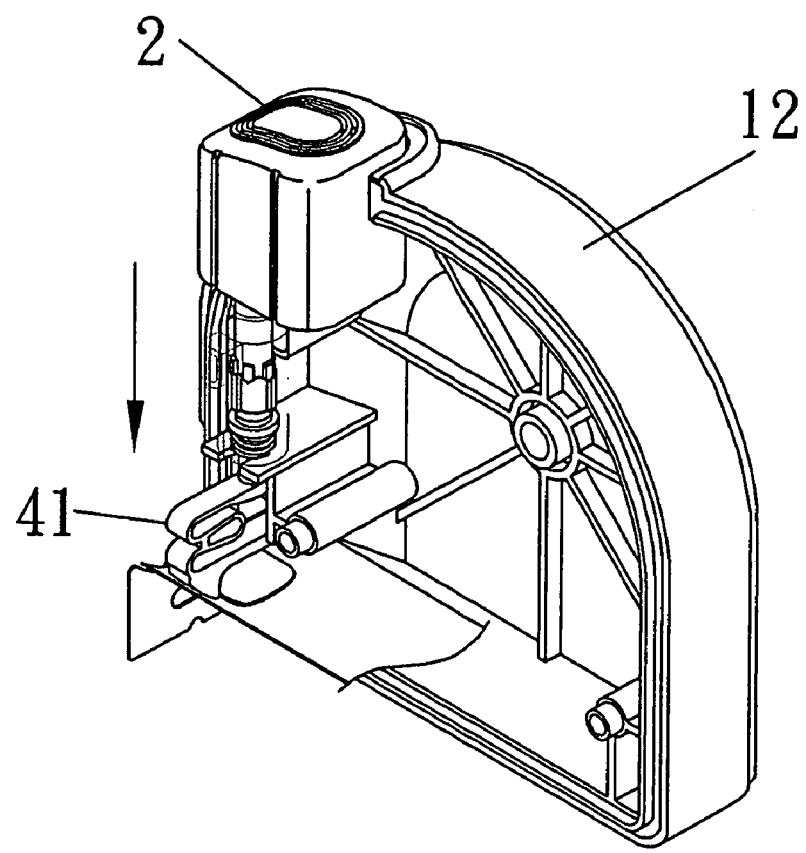
FIG. 7 is a partial perspective view showing the braking mechanism of the present invention in a state of releasing the button.

By the construction mentioned above, as shown in FIG. 6, when the control button 2 is pressed down, the upper sleeve 43, the lower sleeve 42 and the pressing base 41 are moved downward, when the pressing base 41 depresses the upper surface of tape rule, because the upper sleeve 43 only rotates a fixed angle (for example, 30°), the first group and second group of blocks 434, 435 cannot respectively be opposed to and fallen into said guiding grooves 44b, 44a, then the upper sleeve 43 can be stopped at a lower position, and the pressing base 41 is pressed downward to depress the tape role firmly. As shown in FIG. 7, when the control button 2 is pressed downward again, the upper sleeve 43 again rotates another fixed angle (for example, 30°), the first group and second group of blocks 434, 435 then are respectively moved to a position opposed to and fallen into said guiding grooves 44b, 44a. Then by the rebound force of spring 414, the pressing base 41 then is pushed upward to a position of releasing the tape rule 3.

Accordingly, from the aforementioned description, the braking structure of measuring tape of present invention of the present invention certainly has the effect of sustaining the tape rule in a steady condition. Although the present invention has been described using a specified embodiment, the examples are meant to be illustrative and not restrictive. It is clear that many other variations would be possible without departing from the basic approach, demonstrated in the present invention.

What is claimed is:

1. A braking structure for a tape measure comprising:
   a) a housing having:
      i) a left housing piece having a first semi-arc opening and a first tape rule exit; and
      ii) a right housing piece connected to the left housing piece and having a second semi-arc opening and a second tape rule exit, the first and the second semi-arc half openings form a semi-arc opening when the left and right housing pieces are connected, the first and the second tape rule exit form a tape rule exit when the left and right housing pieces are connected;
   b) a tape rule having a first end connected between the first and second housing pieces and a second end movably extending through the tape rule exit;
   c) a braking mechanism slidably located in the housing and having:
      i) a pressing base having an upper end to be formed as an extruded pole and a lower end to be formed as a tape holding element;
      ii) a lower sleeve to be formed as a hollow pipe for holding said extruded pole, on the outer edge of the upper end of the lower section of the lower sleeve is formed with a plurality of equally spaced teeth, and some of the teeth formed with blocks having same height;
      iii) an upper sleeve to be formed as a hollow sleeve with a plurality of sections of different diameters, its lower section is formed with teeth which can be bit with said teeth formed onto the outer edge of said lower sleeve, and two group of blocks formed on the outer wall of said lower section;
      iv) a holding sleeve having a pair of outwardly extruded ears to be inserted into fixing holes inside the housing, there are a plurality of guiding units formed on the inner wall of the holding sleeve, each of the guiding units containing a pair of slope guiding rails a guiding groove formed between said guiding rails, and a guiding groove formed between each two guiding units;
   d) a control button slidably located in the semi-arc opening and engaging the upper flange of the stem.

2. The braking structure according to claim 1, wherein the control button has a pressing portion on a top surface thereof.

3. The braking structure according to claim 1, wherein the braking plate includes a pair of ears, the left housing includes a left inserting hole, the right housing includes a right inserting hole, the pair of ears are pivotally inserted into the left and right inserting holes.

4. The braking structure according to claim 1, wherein the lower portion of said pressing base contains a plurality of buffering spaces.

5. The braking structure according to claim 1, wherein outside said extruded pole formed on said pressing base is mounted with a spring, and said spring can be fixed by a ring.

6. The braking structure according to claim 1, wherein said tape holding element contains a portion for depressing upper surface of tape rule.

7. The braking structure according to claim 1, where in the two groups of blocks formed on the outer wall of the lower section of said upper sleeve are respectively equally separated, and two groups of blocks are different in thickness and to be alternately arranged; the heights of said groups of blocks are same but their thickness are different.

8. The braking structure according to claim 1, wherein said guiding groove formed between each two guiding units has a depth larger than said guiding groove formed between said slope guiding rails.

\* \* \* \* \*